United States Patent
Barnes et al.

(10) Patent No.: US 10,455,134 B2
(45) Date of Patent: Oct. 22, 2019

(54) TEMPORAL PROCESSES FOR AGGREGATING MULTI DIMENSIONAL DATA FROM DISCRETE AND DISTRIBUTED COLLECTORS TO PROVIDE ENHANCED SPACE-TIME PERSPECTIVE

(71) Applicant: GALILEO GROUP, INC., Melbourne, FL (US)

(72) Inventors: Donald Michael Barnes, Melbourne, FL (US); James Michael Grichnik, Miami Beach, FL (US)

(73) Assignee: GALILEO GROUP, INC., Melbourne, FL (US)

( * ) Notice: Subject to any disclaimer, the term of this patent is extended or adjusted under 35 U.S.C. 154(b) by 1 day.

(21) Appl. No.: 15/521,871

(22) PCT Filed: Oct. 26, 2015

(86) PCT No.: PCT/US2015/057421
§ 371 (c)(1),
(2) Date: Apr. 25, 2017

(87) PCT Pub. No.: WO2016/069498
PCT Pub. Date: May 6, 2016

(65) Prior Publication Data
US 2018/0253862 A1    Sep. 6, 2018

Related U.S. Application Data

(60) Provisional application No. 62/209,787, filed on Aug. 25, 2015, provisional application No. 62/206,754, filed on Aug. 18, 2015, provisional application No. 62/203,310, filed on Aug. 10, 2015, provisional application No. 62/068,738, filed on Oct. 26, 2014.

(51) Int. Cl.
| | |
|---|---|
| *H04N 5/232* | (2006.01) |
| *G06F 16/58* | (2019.01) |
| *G06T 7/73* | (2017.01) |
| *G01C 19/5776* | (2012.01) |
| *G06T 7/40* | (2017.01) |
| *G06T 15/04* | (2011.01) |
| *G06T 15/08* | (2011.01) |
| *G06T 17/20* | (2006.01) |
| *G06K 9/32* | (2006.01) |
| *G06K 9/46* | (2006.01) |
| *G06K 9/62* | (2006.01) |
| *H04W 4/70* | (2018.01) |

(52) U.S. Cl.
CPC ..... *H04N 5/23206* (2013.01); *G01C 19/5776* (2013.01); *G06F 16/58* (2019.01); *G06K 9/3208* (2013.01); *G06K 9/46* (2013.01); *G06K 9/6251* (2013.01); *G06T 7/40* (2013.01); *G06T 7/74* (2017.01); *G06T 15/04* (2013.01); *G06T 15/08* (2013.01); *G06T 17/20* (2013.01); *H04N 5/23219* (2013.01); *H04W 4/70* (2018.02); *G06T 2200/04* (2013.01); *G06T 2200/08* (2013.01); *G06T 2207/10028* (2013.01); *G06T 2207/30196* (2013.01); *G06T 2207/30241* (2013.01); *G06T 2207/30244* (2013.01); *G06T 2215/16* (2013.01)

(58) Field of Classification Search
CPC ............ G06K 9/00771; G06K 9/6251; G06K 9/6288; G06K 9/6289; G06K 2209/21; G06T 7/70; G06T 7/74; G06T 2207/30232; G06T 2207/30241; G06T 2207/30244; G06F 17/30265; G06F 17/30268; G06F 16/58; G06F 16/5866; G06F 16/587
See application file for complete search history.

(56) References Cited

U.S. PATENT DOCUMENTS

| | | | |
|---|---|---|---|
| 6,021,344 A | 2/2000 | Liu et al. | 600/476 |
| 6,427,022 B1 | 7/2002 | Craine et al. | 382/128 |
| 6,608,628 B1 | 8/2003 | Ross et al. | 345/619 |
| 6,671,737 B1 | 12/2003 | Snowdon et al. | 709/243 |
| 7,213,766 B2 | 5/2007 | Ryan et al. | 235/492 |
| 7,233,693 B2 | 6/2007 | Momma | 382/162 |
| 8,543,519 B2 | 9/2013 | Guyoin et al. | 706/12 |
| 8,743,219 B1 | 6/2014 | Bledsoe | 348/208.4 |
| 8,903,568 B1 | 12/2014 | Wang et al. | B64C 19/00 |
| 9,019,383 B2 | 4/2015 | Jung et al. | H04N 1/00347 |
| 9,280,038 B1 | 3/2016 | Pan et al. | G03B 17/561 |
| 9,380,275 B2 | 6/2016 | Davidson et al. | H04N 7/183 |
| 9,599,993 B2 | 3/2017 | Kumar | G05D 1/104 |
| 9,606,535 B2 | 3/2017 | Humenay | G05D 1/0027 |

(Continued)

OTHER PUBLICATIONS

International Search Report and Written Opinion for International Patent Application No. PCT/US2015/057421, dated Feb. 8, 2016, 12 pages.

*Primary Examiner* — Andrew W Johns
(74) *Attorney, Agent, or Firm* — Morgan, Lewis & Bockius LLP

(57) ABSTRACT

At a central controlling system, a composite map is constructed based on a previous dataset that includes (A) images of a target obtained by imaging devices at a first time, and (B) respective meta data associated with the images. Imaging devices collect image data during a second time after the first time. In accordance with the composite map, the imaging devices obtain images of the target and associate meta data with the images. The images and respective meta data are communicated to the central controlling system. The positions and orientations of the imaging devices when the respective images were obtained, and when the images were obtained, are used to index the images against the target, thereby aggregating multi-dimensional data for the target. Temporal information about a characteristic of the target over time is then extracted from the aggregated multi-dimensional data.

19 Claims, 9 Drawing Sheets

(56) References Cited

U.S. PATENT DOCUMENTS

| | | |
|---|---|---|
| 9,663,244 B2 | 5/2017 | Zhao et al. ............ B64D 47/09 |
| 9,678,506 B2 | 6/2017 | Bachrach et al. ... G05D 1/0016 |
| 9,688,399 B1 | 6/2017 | Dobbins .............. B64C 39/024 |
| 9,738,380 B2 | 8/2017 | Claridge et al. ....... B64C 39/024 |
| 9,798,322 B2 | 10/2017 | Bachrach et al. ... G05D 1/0038 |
| 9,942,511 B2 | 4/2018 | Jung et al. ........... H04N 7/0117 |
| 10,003,762 B2 | 6/2018 | Jung et al. ............... H04N 5/44 |
| 2007/0052856 A1 | 3/2007 | Jung et al. .................... 348/565 |
| 2009/0318815 A1 | 12/2009 | Barnes et al. ................ 600/473 |
| 2012/0233000 A1* | 9/2012 | Fisher et al. ........... G06Q 30/02 |
| | | 705/14.71 |
| 2013/0100128 A1 | 4/2013 | Steedly et al. .......... G06T 17/00 |
| 2013/0101223 A1* | 4/2013 | Kawanishi et al. ..... G06K 9/46 |
| | | 382/195 |
| 2013/0136341 A1 | 5/2013 | Yamamoto .............. G06T 17/00 |
| 2013/0222369 A1 | 8/2013 | Huston et al. ......... G06T 19/006 |
| 2013/0293686 A1 | 11/2013 | Blow et al. ..................... 348/50 |
| 2014/0012459 A1 | 1/2014 | Kramer et al. .......... G06F 17/00 |
| 2014/0139639 A1 | 5/2014 | Wagner et al. .... H04N 13/0275 |
| 2014/0257595 A1 | 9/2014 | Tillmann ................ B64C 19/00 |
| 2014/0307110 A1 | 10/2014 | Liu .................... H04N 5/23267 |
| 2014/0313303 A1 | 10/2014 | Davis et al. .......... G06T 3/0068 |
| 2015/0087927 A1 | 3/2015 | Manzke et al. ....... A61B 5/1076 |
| 2015/0134143 A1 | 5/2015 | Willenborg ........... B64C 39/024 |
| 2016/0139595 A1 | 5/2016 | Yang et al. ........... G05D 1/0016 |
| 2018/0095464 A1 | 4/2018 | Takayama et al. .. G05D 1/0088 |

\* cited by examiner

TEMPORAL PROCESSES FOR AGGREGATING MULTI DIMENSIONAL DATA FROM DISCRETE AND DISTRIBUTED COLLECTORS TO PROVIDE ENHANCED SPACE-TIME PERSPECTIVE

CROSS-REFERENCE TO RELATED APPLICATIONS

This application is a National Stage of International Patent Application No. PCT/US2015/057421 filed Oct. 26, 2015 and published as WO 2016/069498 A1, which claims priority to U.S. Provisional Application No. 62/209,787 filed Aug. 25, 2015, U.S. Provisional Application No. 62/206,754 filed Aug. 18, 2015, U.S. Provisional Application No. 62/203,310 filed Aug. 10, 2015, and U.S. Provisional Application No. 62/068,728 filed Oct. 26, 2014, the entire contents of which applications is incorporated herein for all purposes by this reference.

TECHNICAL FIELD

This relates generally to image processing and informatics, including but not limited to capturing and consolidating image data using multiple sensor devices and dynamic control signals.

BACKGROUND

The use of imaging technology for analyzing and detecting changes of surface structures has a number of broad biomedical and non-biological applications, ranging from medical imaging and disease detection, to verifying the integrity of building structures. Despite significant advances in the processing and imaging capabilities of consumer devices, imaging technology and equipment enabling this surface imaging and analysis functionality has traditionally been prohibitively costly and impractical for adoption by the broad consumer demographic. Furthermore, mechanisms for aggregating and aligning subject data on a large scale for enhanced surface informatics based detection also remain substantially undeveloped.

SUMMARY

Accordingly, there is a need for faster, more efficient methods, systems, devices, and interfaces for capturing, aligning, and aggregating image data at different times using sensor devices. Images and associated meta data of a particular subject may be captured at different times by utilizing the robust sensing capabilities of sensor devices, such as smart phones equipped with cameras, accelerometers, and gyroscopes. By using information from previous data captures, such as positional and orientation data associated with images from previous data captures, subsequent data may be obtained in an aligned fashion, thereby permitting captured data to be aggregated and temporally analyzed. Such methods and interfaces optionally complement or replace conventional methods for capturing, aligning, and aggregating image data using sensor devices.

In accordance with some embodiments, a method is performed at a central controlling system (e.g., a processing device) having one or more processors and memory for storing one or more programs for execution by the one or more processors. The method includes constructing a composite map based on a previous dataset. The previous dataset includes (A) a plurality of two-dimensional pixilated images of a target obtained by one or more computer-enabled imaging devices (e.g., client devices, such as smart phones) during a first time, and (B) respective meta data associated with each of the plurality of two-dimensional pixilated images, wherein the respective meta data indicates (i) positional and orientation data that includes a position and orientation of a respective computer-enabled imaging device when the respective image is obtained, (ii) an indication of when the respective image is obtained, and an (iii) identity of the respective computer-enabled imaging device. Each of the one or more computer-enabled imaging devices are used to collect respective image data of the target during a second time subsequent to the first time, by causing each respective computer-enabled imaging device of the one or more computer-enabled imaging devices to execute a method of data capture. The method of data capture includes obtaining, in accordance with the composite map based on the previous dataset, a respective two-dimensional pixilated image of the target. Meta data is associated with the respective two-dimensional pixilated image, wherein the respective meta data indicates respective (i) positional and orientation data that includes a position and orientation of the respective computer-enabled imaging device when the respective image is obtained, (ii) an indication of when the respective image is obtained, and an (iii) identity of the respective computer-enabled imaging device. The respective two-dimensional pixilated image of the target and the respective meta data are then communicated to the central controlling system. The central controlling system receives one or more respective two-dimensional pixilated images and associated meta data collected from the second time from each of the one or more computer-enabled imaging devices. The position and orientation of each of the respective computer-enabled imaging devices when the respective images were obtained, and the indication of when the images were obtained, are used to index the images against the target, thereby aggregating multi-dimensional data for the target. Temporal information about a characteristic of the target over time is then extracted from the aggregated multi-dimensional data for the target.

In accordance with some embodiments, a computer-enabled imaging device includes a processor and memory for storing one or more programs for execution by the processor, the one or more programs including instructions for performing any of the operations described above.

In accordance with some embodiments, a central controlling system includes a processor and memory for storing one or more programs for execution by the processor, the one or more programs including instructions for performing any of the operations described above.

In accordance with some embodiments, a computer-readable storage medium storing one or more programs for execution by one or more processors, the one or more programs including instructions for performing any of the operations described above.

Thus, devices and systems are provided with faster, more efficient methods for capturing, aligning, and aggregating image data, thereby increasing the value, effectiveness, efficiency, and user satisfaction with such devices and systems.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first smart phone could be termed a second smart phone, and, similarly, a second smart phone could be termed a first smart phone, without departing from the scope of the various described embodiments. The first smart phone and the second smart phone are both smart phones, but they are not the same smart phone.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
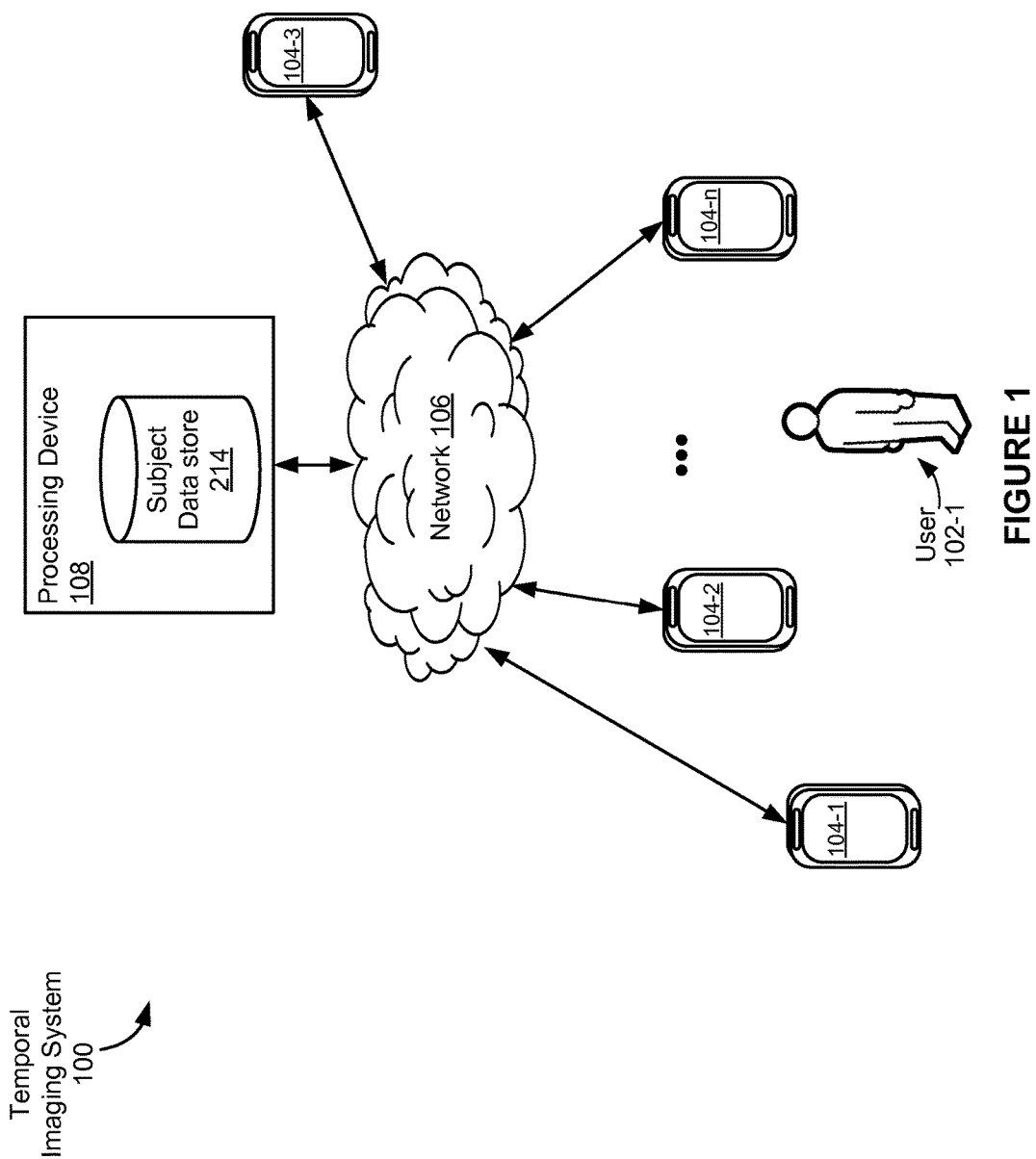
FIG. 1 is a block diagram illustrating an exemplary temporal imaging system, in accordance with some embodiments.

FIG. 1 is a block diagram illustrating a temporal imaging system 100, in accordance with some embodiments. The imaging system 100 includes a number of client devices (also called "computer-enabled imaging devices," "client systems," "client computers," or "clients") 104-1, 104-2, 104-3 . . . 104-n and a processing device 108 (also called a "central controlling system") communicably connected to one another by one or more networks 106 (e.g., the Internet, cellular telephone networks, mobile data networks, other wide area networks, local area networks, metropolitan area networks, and so on).

In some embodiments, the one or more networks 106 include a public communication network (e.g., the Internet and/or a cellular data network), a private communications network (e.g., a private LAN or leased lines), or a combination of such communication networks. In some embodiments, the one or more networks 106 use the HyperText Transport Protocol (HTTP) and the Transmission Control Protocol/Internet Protocol (TCP/IP) to transmit information between devices or systems. HTTP permits client devices to access various resources available via the one or more networks 106. In some embodiments, the one or more networks 106 are wireless communications channels based on various custom or standard wireless communications protocols (e.g., IEEE 802.15.4, Wi-Fi, ZigBee, 6LoWPAN, Thread, Z-Wave, Bluetooth Smart, ISA100.11a, WirelessHART, MiWi, etc.), or any other suitable communication protocol, including communication protocols not yet developed as of the filing date of this document. Alternatively, in some embodiments, at least a portion of the one or more networks 106 comprise physical interfaces based on wired communications protocols (e.g., Ethernet, USB, etc.). Although all devices are illustrated as being interconnected through the network 106, in some implementations, any of the aforementioned devices or systems are communicably connected with each other either directly (i.e., device-to-device) or through a network device (e.g., a router represented by network 106), or with only a subset of the other devices of the imaging system 100, via any combination of the aforementioned networks 106 (e.g., client devices 104 communicate with one another via Bluetooth, transmit time-stamped images to the processing device 108 via a cellular network, and receive control signals from the control device 110 via Wi-Fi). The various embodiments of the invention, however, are not limited to the use of any particular communication protocol.

In some embodiments, the client devices 104-1, 104-2, . . . 104-n are computing devices such as cameras, video recording devices, smart watches, personal digital assistants, portable media players, smart phones, tablet computers, 2D devices, 3D (e.g., virtual reality) devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to capture various types of data (e.g., multimedia, such as image, video, and/or audio data; meta data; etc.), as well as communicate with other client devices 104 and/or the processing device 108.

In some embodiments, client devices are configured to be mounted on or attached to various apparatuses/platforms which affect and dictate a motion of the client device during data capture. Client devices may, for example, be fixed to structures (e.g., walls, ceilings), attached to vehicles (e.g., bikes, automobiles, planes, drones, etc.), and/or attached to humans/animals (e.g., via clothing, helmets, collars) to record subjects or activities in a multidimensional manner (e.g., spatially and temporally). In some embodiments, mobile apparatuses to which client devices are mounted include one or more processors and memory storing instructions (e.g., received control signals including positional/orientation data from a previous dataset/composite map; instructions which, when executed, actuate mechanical components of the mobile apparatus such that the mobile apparatus and the mounted client device are aligned with a specified position and/or orientation) for execution by the one or more processors. In some embodiments, mobile apparatuses include at least some of the same operational capabilities and features of the client devices 104, which may be used additionally, alternatively, and/or in conjunction with the client devices 104 (e.g., drone devices include additional sensors that may be used in conjunction with sensors of the client devices 104). In some embodiments, the first client device is fixedly mounted to the mobile apparatus (e.g., drone) such that sensor readings by the first client device are substantially representative of environmental conditions associated with the mobile apparatus. For example, sensor readings obtained by the first client device that indicate an orientation of the first client device, also indicate an orientation of a mobile apparatus to which the first client device is mounted. In other words, in some embodiments, because the first client device and the mobile apparatus are fixedly mounted, their respective orientations are substantially the same. Similarly, as another example, a location of the first client device (derived from sensor readings acquired by the first client device) is substantially the same as a location of the mobile apparatus.

Client devices 104 (which may be mounted to respective mobile apparatuses) may be deployed to obtain or generate data for a designated target (e.g., facial region of a human subject, crop fields, urban landscapes, etc.) for later processing and analysis (e.g., transmitting captured data to a processing device 108 and/or other client devices for processing). Client devices 104 may also be configured to receive, display, and/or manipulate data (e.g., data generated, obtained, or produced on the device itself; constructed composite maps; aggregated multi-dimensional data received from the processing device 108 or other client devices, etc.). In some embodiments, the client devices 104 (and/or respective mobile apparatuses) capture multimedia data (e.g., time-stamped images, video, audio, etc.), and associate respective meta data (e.g., environmental information (time, geographic location), device readings (sensor readings from accelerometers, gyroscopes, barometers), etc.) with the captured multimedia data. After the captured data is processed (e.g., by a processing device 108, client devices 104, etc.), the same or other client devices 104 may subsequently receive data from the processing device 108 and/or other client devices for display (e.g., temporally, spectrally, and/or spatially aggregated multi-dimensional data, including two or three-dimensional composite maps, point clouds, textured maps, etc.).

The processing device 108 (which, in some embodiments, may itself be a client device 104) stores, processes, aggregated, consolidates, and/or analyzes data received from one or more devices (e.g., datasets of a subject received from client devices 104, which include multimedia data, associated meta data, etc.). The resulting data of such processing and analysis (e.g., constructed composite maps, aggregated multi-dimensional data) are in turn disseminated to the same and/or other devices for viewing, manipulation, and/or further processing and analysis. In some embodiments, the processing device 108 consolidates data received from one or more client devices 104 and performs one or more geomatics based processes. For example, using associated meta data, the processing device 108 constructs two or three-dimensional composite maps, where collection of image data at subsequent times is performed in accordance with the constructed composite map (e.g., aligning the positions and orientations of client devices with positional/orientation data of previously captured images in order to enable temporal analyses). In some embodiments, useful biological or non-biological data is further derived and extracted from visual representations generated by geomatics based processes (e.g., extracting temporal data the aggregated multi-dimensional data). Extracted data can be further processed or analyzed for detection purposes (e.g., detecting a temporally observable change). In some embodiments, the processing device 108 is a single computing device such as a computer server, while in other embodiments, the processing device 108 is implemented by multiple computing devices working together to perform the actions of a server system (e.g., cloud computing).

In some embodiments, the processing device 108 (or one or more client devices 104) also serves as a control device for guiding subsequent collection of image data by one or more devices. The processing device may, for example, send control signals/commands to one or more devices (e.g., client device 104, mobile apparatus) for execution during subsequent image collection, where the control signals may include instructions executable by the receiving devices that modify parameters of a mobile pattern (e.g., the positioning of a drone) or capture parameters (e.g., increased image resolution, data capture start/end time, capture schedule, position/orientation of capture, etc.) of the receiving devices.

In some embodiments, data (e.g., aggregated multi-dimensional data) is sent to and viewed by client devices in a variety of output formats, and/or for further processing or manipulation (e.g., CAD programs, 3D printing, virtual reality displays, holography applications, etc.). In some embodiments, data is sent for display to the same client device that performs the image capture and acquires sensor readings (e.g., client devices 104), and/or other systems and devices (e.g., data apparatus 108, a client device 104-3 that is a dedicated viewing terminal, etc.). In some embodiments, client devices 104 access data and/or services provided by the processing device 108 by execution of various applications. As another example, one or more of the client devices 104-1, 104-2, . . . 104-n execute software applications that are specific to viewing and manipulating data (e.g., surface informatics "apps" running on smart phones or tablets).

Figure 2:
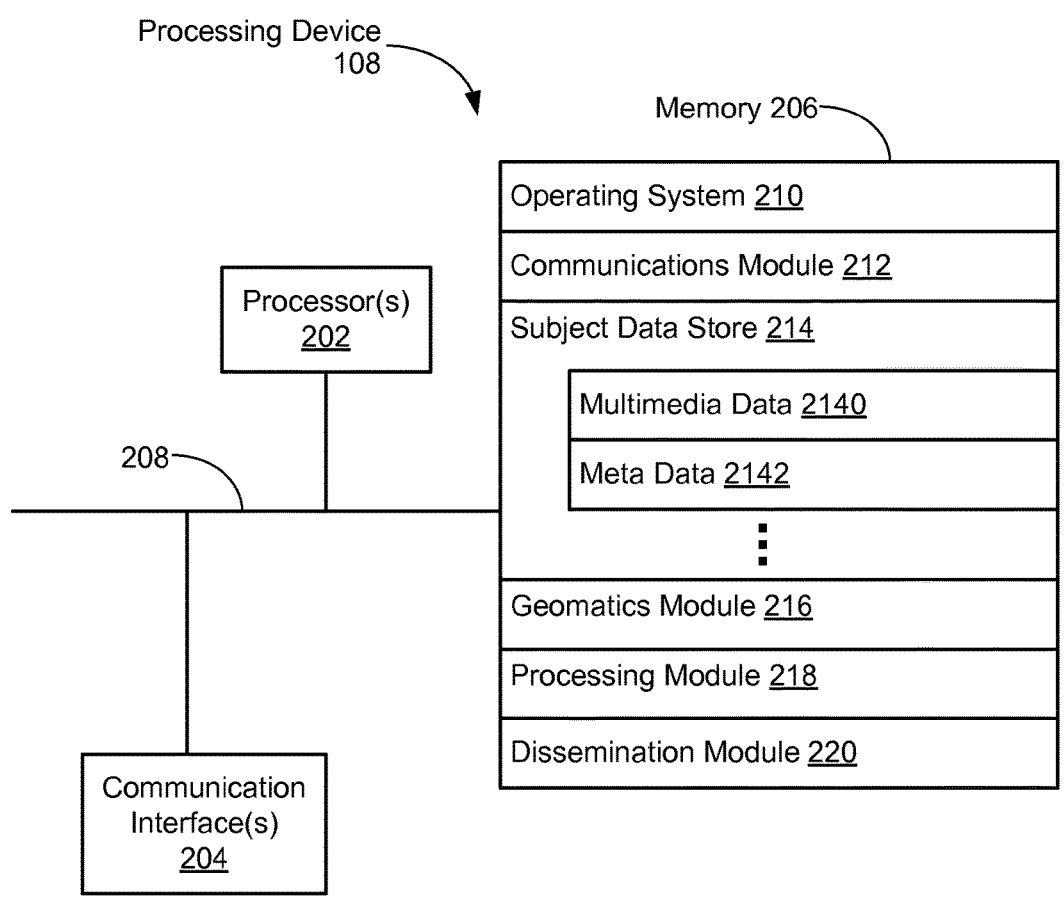
FIG. 2 is a block diagram illustrating an exemplary processing device, in accordance with some embodiments.

FIG. 2 is a block diagram illustrating an exemplary processing device 108, in accordance with some embodiments. In some embodiments, the processing device 108 is a central controlling system, client device (e.g., one or more client devices 104, FIG. 1), processing device apparatus, server system, or any other electronic device for receiving, collecting, storing, consolidating, displaying, and/or processing data received from a plurality of devices over a network (sometimes referred to alternatively as a data processing and display system).

The processing device 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The processing device 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Figure 3:
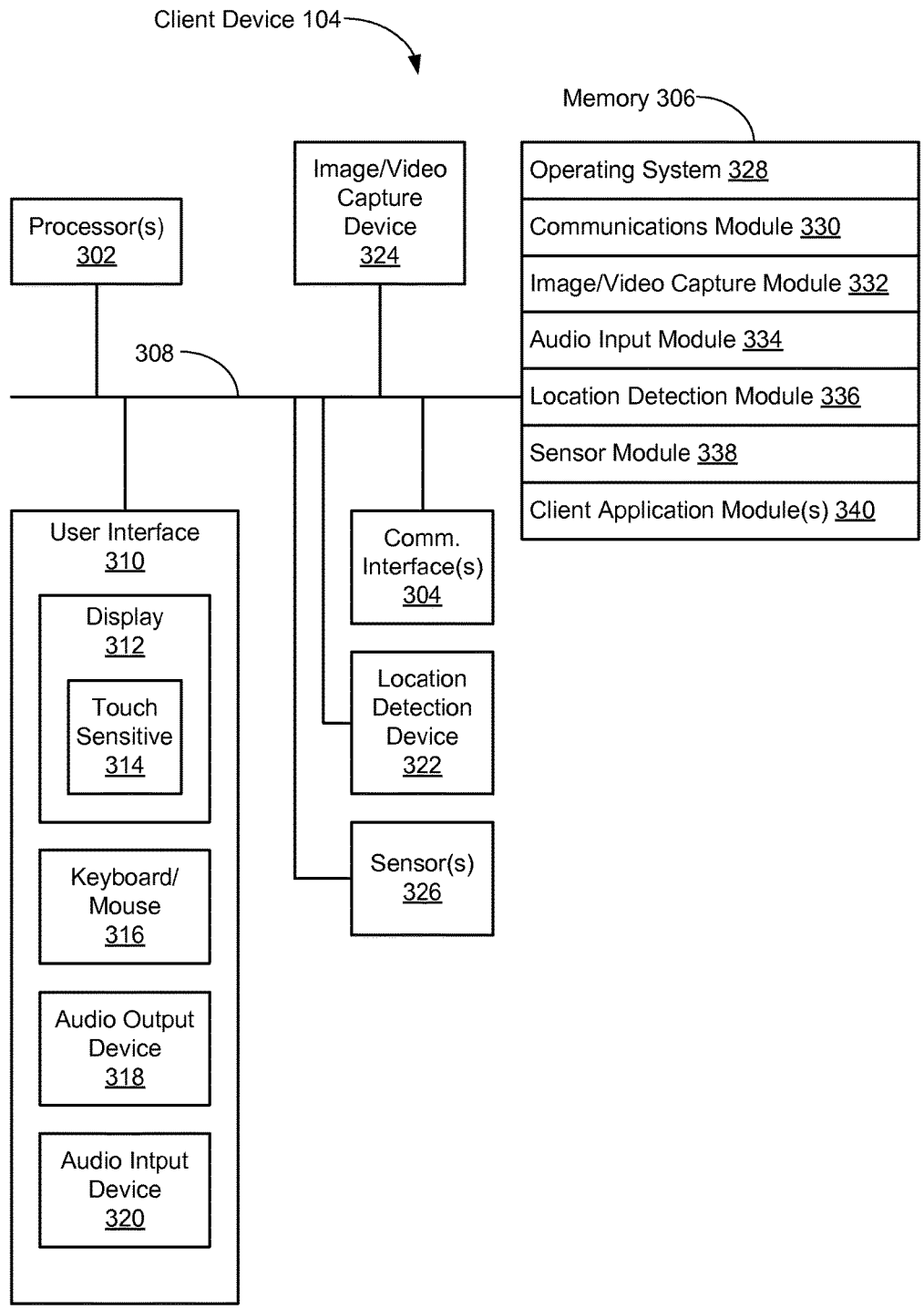
FIG. 3 is a block diagram illustrating an exemplary client device, in accordance with some embodiments.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 optionally includes one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the processing device 108 to other computers, systems, and/or client devices 104 via the one or more communication network interfaces 204 (wired or wireless) and one or more communication networks (e.g., the one or more networks 106)
- a subject data store 214 for storing captured data associated with a target (e.g., captured by one or more client devices 104, FIGS. 1 and 3), such as:
  - multimedia data 2140 for storing multimedia data (e.g., time-stamped images, video, audio, etc.) captured by one or more sensors or devices (e.g., two-dimensional pixilated detector and/or microphone of a client device 104, FIG. 3) of the client devices 104 (and/or mobile apparatuses); and
  - meta data 2142 for storing meta data (e.g., device data, environmental device measurements, and/or other data associated with captured multimedia) acquired by a client device 104 (and/or respective mobile apparatuses), including but not limited to: device identifiers (e.g., identifying the device of a group of devices that captured the multimedia item, which may include an arbitrary identifier, a MAC address, a device serial number, etc.), temporal data (e.g., date and time of a corresponding capture), location data (e.g., GPS coordinates of the location at which multimedia item was captured), multimedia capture/device settings (e.g., image resolution, focal length, frequency at which images are captured, frequency ranges that a pixilated detector is configured to detect, etc.), sensor frequencies (e.g., the respective frequency at which sensors of a device captured data, such as an accelerometer frequency, a gyroscope frequency, a barometer frequency, etc.), accelerometer readings (e.g., in meters/sec2), positional data (e.g., (x, y, z) coordinates of the device with respect to a pre-defined axes or point of reference), orientation data (e.g., roll ($\phi$), pitch ($\theta$), yaw ($\psi$)), and/or any additional sensor or device measurements or readings for determining spatial, spectral, and/or temporal characteristics of a device, targets/subjects, or regions of interest;
- geomatics module 216 for processing, manipulating, aggregating, and analyzing data (e.g., image data and associated meta data received from one or more client devices 104) in order to generate and view spatial, spectral, and/or temporal representations of a target (e.g., constructed composite maps, aggregated multi-dimensional data, etc.);
- processing module 218 for processing, analyzing, and extracting data (e.g., temporal data from) from generated spatial, spectral, and/or temporal representations of the target (e.g., constructed maps, aggregated multi-dimensional data, etc.), for detecting temporal observable changes and/or conditions (e.g., determining satisfaction of change thresholds, etc.), and/or for generating control signals that cause collection of image data (e.g., sent to one or more client device 104); and
- dissemination module 220 for sending data (e.g., constructed composite maps, aggregated multi-dimensional data, alerts, etc.) for viewing and/or further processing.

The subject data store 214 (and any other data storage modules) stores data associated with one or more subjects in one or more types of databases, such as graph, dimensional, flat, hierarchical, network, object-oriented, relational, and/or XML databases, or other data storage constructs.

FIG. 3 is a block diagram illustrating an exemplary client device 104, in accordance with some embodiments.

The client device 104 (e.g., a computer-enabled imaging device, such as a smart phone) typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104.

The client device 104 also optionally includes an image/video capture device 324, such as a camera or webcam. In some embodiments, the image/video capture device 324 includes a two-dimensional pixilated detector/image sensor configured to capture images at one or more predefined resolutions (e.g., a low resolution, such as 480×360, and a high resolution, such as 3264×2448). In some embodiments, the image/video capture device 324 captures a plurality of images (e.g., a stream of multiple images) at a predefined frequency (e.g., 30 Hz). In some embodiments, the client device 104 includes a plurality of image/video capture devices 324 (e.g., a front facing camera and a back facing camera), where in some implementations, each of the multiple image/video capture devices 324 captures distinct images for subsequent processing (e.g., capturing images at different resolutions, ranges of light, etc.). Optionally, the client device 104 includes one or more illuminators (e.g., a light emitting diode) configured to illuminate a target (e.g., subject, environment, etc.). In some embodiments, the one or more illuminators are configured to illuminate specific wavelengths of light (e.g., ultraviolet, infrared, polarized, fluorescence, for night time operations when there is less than a threshold level of ambient light, for example), and the image/video capture device 324 includes a two-dimensional pixilated detector/image sensor configured with respect to wavelength(s) of the illuminated light. Additionally and/or alternatively, the image/video capture device 324 includes one or more filters configured with respect to wavelength(s) of the illuminated light (i.e., configured to selectively filter out wavelengths outside the range of the illuminated light).

In some embodiments, the client device 104 includes one or more sensors 326 including, but not limited to, accelerometers, gyroscopes, compasses, magnetometer, light sensors, near field communication transceivers, barometers, humidity sensors, temperature sensors, proximity sensors, lasers, range finders (e.g., laser-based), and/or other sensors/devices for sensing and measuring various environmental conditions. In some embodiments, the one or more sensors operate and obtain measurements at respective predefined frequencies.

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 328 that includes procedures for handling various basic system services and for performing hardware dependent tasks, and doing so in accordance with one or more control signals (e.g., operating the image/video capture module 332/sensor module 338 in accordance with received control signals from the processing device 108);
- a network communication module 330 that is used for connecting the client device 104 to other computers, systems (e.g., processing device 108), control devices (e.g., control device 110), client devices 104, and/or drone device 102 via the one or more communication network interfaces 304 (wired or wireless) and one or more communication networks (e.g., Internet, cellular telephone networks, mobile data networks, other wide area networks, local area networks, metropolitan area networks, IEEE 802.15.4, Wi-Fi, Bluetooth, etc.);
- an image/video capture module 332 (e.g., a camera module) for processing a respective image or video captured by the image/video capture device 324, where the respective image or video may be sent or streamed (e.g., by a client application module 340) to the processing device 108;
- an audio input module 334 (e.g., a microphone module) for processing audio captured by the audio input device 320, where the respective audio may be sent or streamed (e.g., by a client application module 340) to the processing device 108;
- a location detection module 336 (e.g., a GPS, Wi-Fi, or hybrid positioning module) for determining the location of the client device 104 (e.g., using the location detection device 322) and providing this location information for use in various applications (e.g., client application module 340);
- a sensor module 338 for obtaining, processing, and transmitting meta data (e.g., device data, environmental device measurements, and/or other data associated with captured multimedia) acquired by the client device 104 and/or a respective drone device 102, including but not limited to: device identifiers (e.g., identifying the device of a group of devices that captured the multimedia item, which may include an arbitrary identifier, a MAC address, a device serial number, etc.), temporal data (e.g., date and time of a corresponding capture), location data (e.g., GPS coordinates of the location at which multimedia item was captured), multimedia capture/device settings (e.g., image resolution, focal length, frequency at which images are captured, frequency ranges that a pixilated detector is configured to detect, etc.), sensor frequencies (e.g., the respective frequency at which sensors of a device captured data, such as an accelerometer frequency, a gyroscope frequency, a barometer frequency, etc.), accelerometer readings (e.g., in meters/sect), positional data (e.g., (x, y, z) coordinates of the device with respect to a predefined axes or point of reference), orientation data (e.g., roll ($\phi$), pitch ($\theta$), yaw ($\omega$)), and/or any additional sensor or device measurements or readings for determining spatial, spectral, and/or temporal characteristics of a device, targets/subjects, or regions of interest; and
- one or more client application modules 340, including the following modules (or sets of instructions), or a subset or superset thereof:
  - a control module for receiving (e.g., from a processing device 108, client device 104, etc.), generating (e.g., based on a composite map), storing, providing, rebroadcasting, and/or operating components of the client device 104 in accordance with control signals (e.g., received from processing device 108) and/or composite maps (e.g., meta data of datasets used to construct a composite map, such as positional/orientation data associated with images of the datasets);
  - a web browser module (e.g., Internet Explorer by Microsoft, Firefox by Mozilla, Safari by Apple, or Chrome by Google) for accessing, viewing, and interacting with web sites (e.g., a web site provided by the processing device 108), captured data (e.g., images), and/or other received data (e.g., composite map, aggregated multi-dimensional data, etc.); and/or
  - other optional client application modules for viewing and/or manipulating captured data or other received data, such as applications for photo management, video management, a digital video player, computer-aided design (CAD), 3D viewing (e.g., virtual reality), 3D printing, holography, and/or other graphics-based applications.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Furthermore, in some implementations, the functions of any of the devices and systems described herein (e.g., client devices 104, processing device 108, etc.) are interchangeable with one another and may be performed by any other devices or systems, where the corresponding sub-modules of these functions may additionally and/or alternatively be located within and executed by any of the devices and systems. As one example, although the client device 104 (FIG. 3) includes sensors and modules for obtaining/processing images (e.g., sensors 326 and an image/video capture module 332) and obtaining respective sets of meta data (e.g., sensor module 338) in accordance with a composite map, in some embodiments a mobile apparatus to which the client device 104 is mounted (not illustrated) may include analogous modules, components, and device capabilities for performing the same operations (e.g., sensors and modules containing instructions for obtaining images and respective meta data in accordance with the composite map). The devices and systems shown in and described with respect to FIGS. 1 through 3 are merely illustrative, and different configurations of the modules for implementing the functions described herein are possible in various implementations.

Figure 4A:
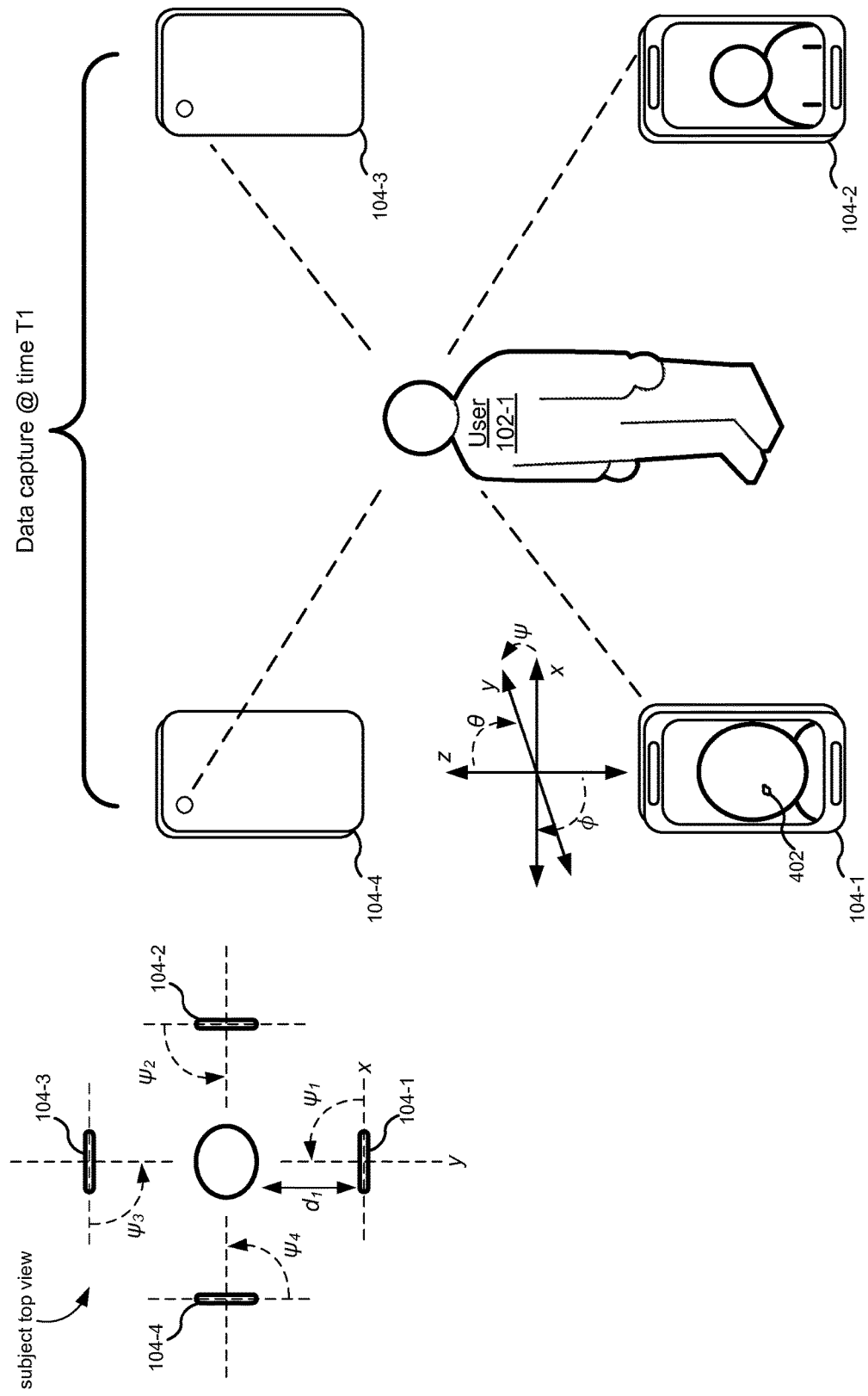
FIGS. 4A-4B illustrate an environment in which image data is captured and aggregated for a target over time, in accordance with some embodiments.
Figure 4B:
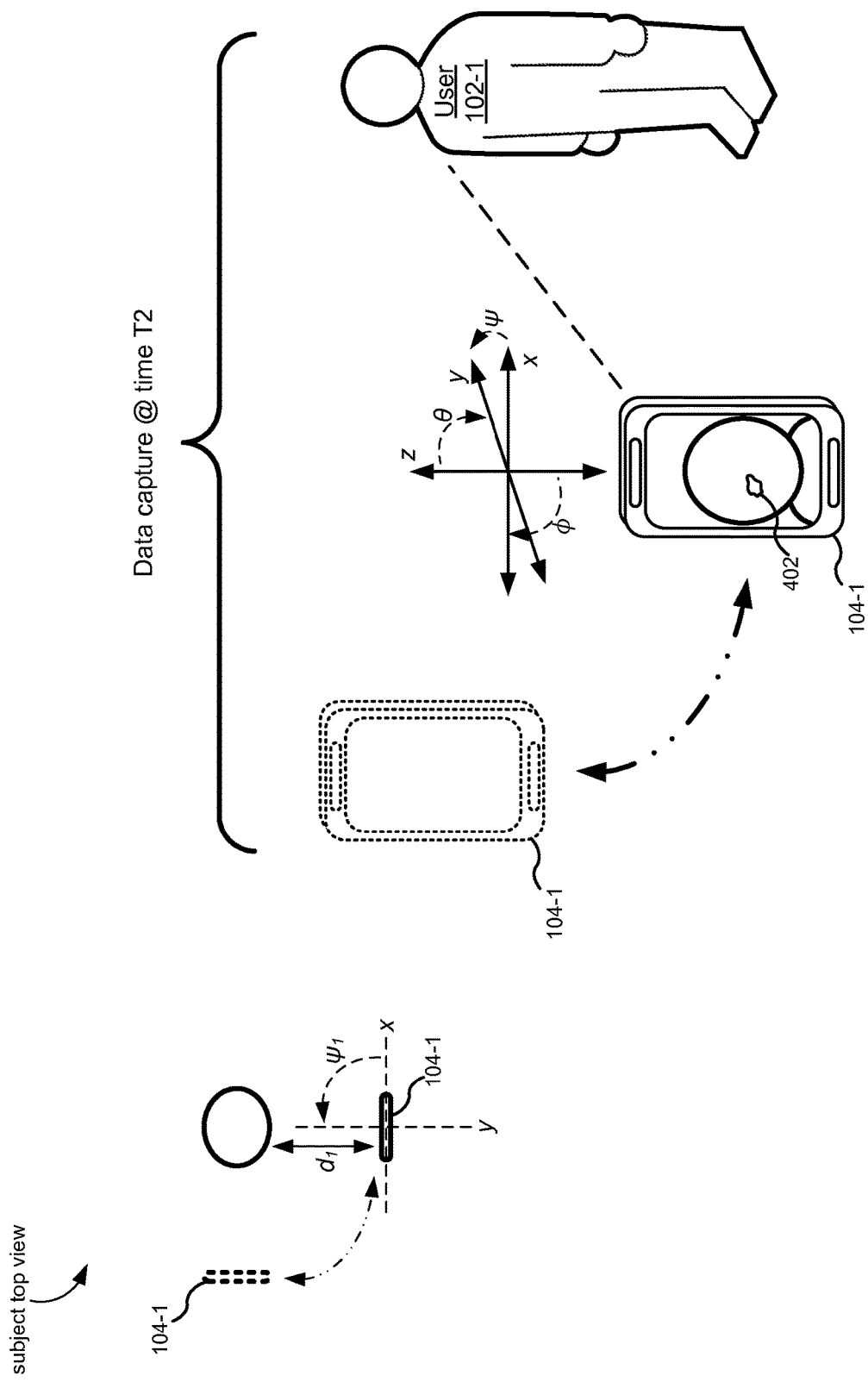

FIGS. 4A-4B illustrate an environment in which image data is captured and aggregated for a target over time, in accordance with some embodiments.

Specifically, the environment shown in FIG. 4A includes client devices 104-1 through 104-4 for obtaining, during a first time T1, a dataset that includes multiple images and respective meta data of a target (e.g., user 102-1) in order to construct a composite map. Continuing with the example in FIG. 4B, the composite map, constructed from the previous dataset, is subsequently used by the same client device 104-1 at a later time T2 to collect additional image data and meta data of the target. In particular, the client device 104-1 is positioned and oriented based on meta data of the previous dataset such that additionally captured image data during time T2 is aligned with the previous dataset. The additional image data and respective meta data, in combination with the previous dataset, are received at a central controlling system for aggregation as multi-dimensional data for the target. Temporal information about characteristics of the target may then be extracted and analyzed. Although the client devices 104 are smart phones in the example illustrated, in other implementations the client devices 104 may be any electronic device with image capture capabilities (e.g., a camera, a PDA, etc.). Furthermore, while the target is a live, biological subject (e.g., a human), the illustrated environment and processes described herein are also applicable to non-biological contexts (as described in greater detail with respect to FIGS. 5A-5D).

Referring to FIG. 4A, the client devices 104 are used to capture one or more still-frame images, video sequences, and/or audio recordings from one or more positions and orientations during time T1. Time T1 (FIG. 4A) and time T2 (FIG. 4B) may correspond to specific intervals (e.g., 20 seconds) or moments of time (e.g., dates, days, hours, seconds, etc.). Concurrently with image capture, client devices 104 also acquire and associate meta data with the obtained images. Meta data includes temporal information (e.g., indication of time of image capture), device information (e.g., identity of a respective client device, such as a unique device identifier), and sensor readings of various environmental conditions obtained from one or more sensors of the client device 104-1 (e.g., sensors 326, such as an accelerometer, gyroscope, barometer, etc.) from which positional and orientation data for a client device can be determined. Positions of the client devices 104 may be defined with respect to a distance from the target (e.g., distance $d_1$ of the client device 104-1), and/or coordinates within a predefined coordinate system (e.g., (x, y, z) coordinates based on a coordinate system defined by the subject top view and a height of the target). An orientation of the client devices 104 is measured with respect to a reference orientation. In this example, orientations of the client devices are defined by an angle of rotation within the x-y axis (i.e., yaw ($\psi$)), an angle of rotation within the y-z axis (i.e., pitch ($\theta$)), and an angle of rotation within the x-z axis (i.e., roll ($\phi$). Meta data is also based on and includes various time-stamped sensor readings obtained from one or more sensors of the client device 104-1 (e.g., sensors 326, such as an accelerometer, gyroscope, barometer, etc.). Other types of meta data are described in greater detail throughout. In this example, image and meta data are captured in the medical context of analyzing a subject's skin condition. As shown on the screen of client device 104-1, a lesion 402 is observed in the facial region of user 102-1.

After data capture during time T1, the captured image data and meta data comprise a collective dataset that is used to construct a two or three-dimensional composite map (not shown). The map, which may be a spatial, spectral, and/or temporal representation of the target, is saved and subsequently used in later data capture processes. Techniques for constructing and using the composite map are described in greater detail with respect to FIG. 5A-5D.

Referring now to FIG. 4B, the composite map previously constructed based on the dataset obtained in FIG. 4A is used to guide subsequent data capture during a later time T2. Specifically, the composite map may be used to align subsequently captured images of a target or a particular region of the target such that temporal information may be extracted.

Continuing the example above, a temporal analysis is performed with respect to the lesion 402 as observed from the particular position and orientation of the client device 104-1 during time T1. As shown in FIG. 4B, prior to time T2, the client device 104-1 is not initially aligned with the position and orientation of the client device 104-1 at time T1, having a position to the right-hand side of the user 102-1. Using the constructed composite map, and deriving the positional and orientation data associated with the images of the previous dataset corresponding to images captured by the client device 104-1 during time T1, the client device 104-1 is guided (e.g., by providing control signals to a mobile apparatus to which the client device 104-1 is mounted, displaying instructions for repositioning/reorienting, etc.) into a position such that aligned image and meta data can be captured for temporal analysis. That is, by using positional and orientation data (e.g., (x, y, z) coordinates, distance $d_1$, $\psi_1$) to align the client device 104-1 at time T2 with the client device 104-1 from time T1, subsequent image and meta data obtained during time T2 are aligned with the data captured in T1, and temporal changes may be observed with respect to the lesion 402. Here, the lesion 402 exhibits growth between times T1 and T2.

After data collection concludes, image and meta data captured during time T1 (e.g., for constructing the composite map) and time T2 (e.g., for the observed lesion 402) is received by a central controlling system (e.g., processing device 108, FIG. 1) and aggregated. Aggregation may, for example, include building upon the existing composite map in order to further refine and add points to the composite map. Temporal information may thereafter be extracted from the aggregated multi-dimensional data, and further processed and/or displayed in order to render analyses of a target or feature of interest over time. Data aggregation, and further analytical operations and processes, are described in greater detail with respect to FIG. 5A-5D.

FIGS. 5A-5D are flow diagrams illustrating a method 500 for capturing and aggregating image data for a target over time, in accordance with some embodiments. In some implementations, the method 500 is performed by one or more devices of one or more systems (e.g., client devices 104, processing device 108, etc. of a temporal imaging system 100, FIGS. 1-3), or any combination thereof. Thus, in some implementations, the operations of the method 500 described herein are entirely interchangeable, and respective operations of the method 500 are performed by any one of the aforementioned devices and systems, or combination of devices and systems. For ease of reference, the methods herein will be described as being performed by a processing device (e.g., processing device 108, FIGS. 1 and 2) or one or more client devices (e.g., client devices 104, FIGS. 1, 3, 4A-4B). While parts of the methods are described with respect to a processing device or client device, any operations or combination of operations of the method 500 may be performed by any electronic device having image capture/processing capabilities (e.g., a computer-enabled imaging device, such as a smart phone, a camera device, a computer-enabled imaging device, a PDA, etc.; a central controlling system/server; etc.). Steps of the method 500 correspond to instructions/programs stored in a memory or other computer-readable storage medium of a processing device (e.g., memory 206 of processing device 108, FIG. 2), the instructions/programs for execution by one or more processors of the processing device (e.g., 202). Additionally and/or alternatively, steps of the method 500 correspond to instructions/programs stored in a memory or other computer-readable storage medium of a client device (e.g., memory 306 of client device 104, FIG. 3), the instructions/programs for execution by one or more processors of the processing device (e.g., 302).

Although some steps of the method 500 are described with respect to either a first or second client device of a plurality of client devices, any operations performed by the second client device may be performed in accordance with any of the embodiments described with respect to the first client device, and vice versa. Furthermore, any respective operations performed by the first and/or second client device may be performed additionally, alternatively, and/or concurrently with one another (e.g., concurrent obtaining of workflows). Moreover, any operations described with respect to the first and/or second client device may be analogously performed by one or more additional client devices of the temporal imaging system 100 (or other devices/systems described herein, such as an additional mobile apparatuses), additionally, alternatively, and/or concurrently with the operations of the first and/or second client device.

As an overview of the method 500, in some embodiments, a processing device (e.g., processing device 108, FIG. 1) constructs a composite map (502, FIG. 5A) based on a previous dataset. The previous dataset includes: (A) a plurality of two-dimensional pixilated images of the target obtained by one or more computer-enabled imaging devices (e.g., client device 104) during a first time, and (B) respective meta data associated with each of the plurality of two-dimensional pixilated images. Each of the one or more client devices are used (518, FIG. 5B) to collect respective image data of the target during a second time subsequent to the first time, by causing each respective client device of the one or more client devices to execute a method of data capture. The method of data capture includes the one or more computer-enabled imaging devices obtaining (520), in accordance with the composite map based on the previous dataset, a respective two-dimensional pixilated image of the target, and associating (530, FIG. 5C) meta data with the respective two-dimensional pixilated image. The respective two-dimensional pixilated image of the target and the respective meta data are communicated (532) to the processing device. The processing device receives (536) one or more respective two-dimensional pixilated images from each of the one or more client devices. The position and orientation of each of the respective client devices when the respective images were obtained, and the indication of when the images were obtained, are then used (538) to index the images against the target, thereby aggregating multi-dimensional data for the target. Temporal information about a characteristic of the target over time is extracted (546, FIG. 5D) from the aggregated multi-dimensional data. An exemplary environment in which the method 500 is performed is described with respect to FIGS. 4A-4B. Various embodiments of the method 500 are described in greater detail below.

Figure 5A:
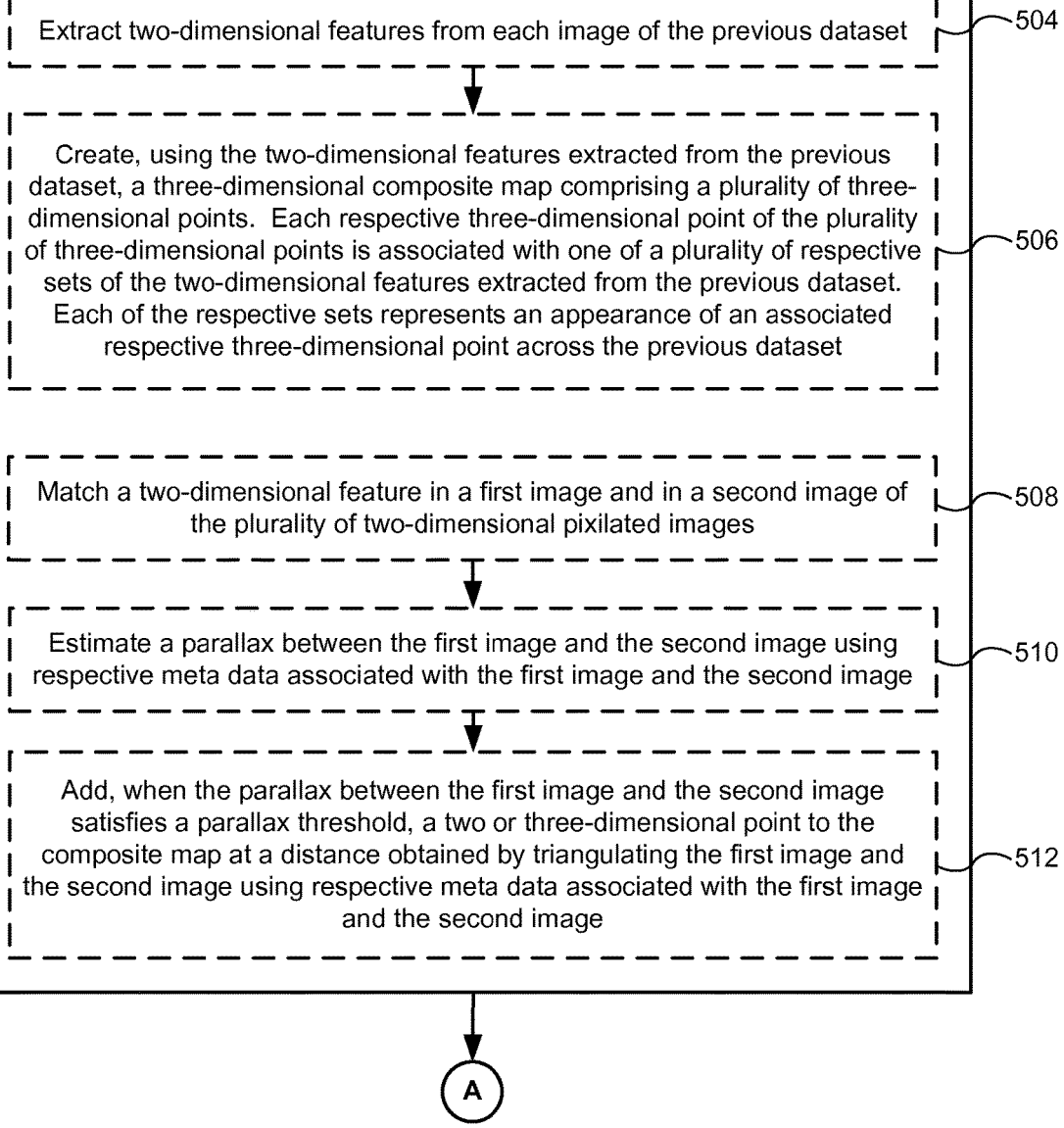
FIGS. 5A-5D are flow diagrams illustrating a method for capturing and aggregating image data for a target over time, in accordance with some embodiments.

Referring now to FIG. 5A, the processing device (e.g., processing device 108, FIG. 1) constructs (502) a composite map based on a previous dataset. The previous dataset includes: (A) a plurality of two-dimensional pixilated images of a target obtained by one or more client devices during a first time; and (B) respective meta data associated with each of the plurality of two-dimensional pixilated images, wherein the respective meta data indicates (i) positional and orientation data that includes a position and orientation of a respective client device when the respective image is obtained, (ii) an indication of when the respective image is obtained, and an (iii) identity of the respective client device (other examples of associated meta data are described throughout, in FIG. 3, for example). As referred to throughout, obtaining images and respective meta data for a given interval of time is generally referred to as an act of data capture or a data capture session. An exemplary data capture session for the previous dataset is illustrated and described with respect to FIG. 4A, where client devices 104 capture multiple images of a facial region of the user 102-1 during time T1.

The composite map may be a multidimensional spatial, spectral, and/or temporal representation of a target, where a target may be a region of interest (e.g., portion, feature, etc.), or any viewable aspect, of a biological (e.g., a human, crop field, etc.) or non-biological (e.g., building surface, urban landscapes, environmental region, etc.) subject. In some embodiments, the target is the biological/non-biological subject itself. In some embodiments, the constructed composite map represents a coordinate system (e.g., two or three-dimensional) predefined with respect to the target. The composite map is constructed, saved, and subsequently used in later data capture processes, and may also be used as a basis for the generation of additional visual representations of the target (e.g., dense point clouds, textured meshes, etc.).

In some embodiments, constructing (502) the map includes extracting (504) two-dimensional features from each image of the previous dataset. Using the two-dimensional features extracted from the previous dataset, a three-dimensional composite map comprising a plurality of three-dimensional points is created (506). Each respective three-dimensional point of the plurality of three-dimensional points is associated with one of a plurality of respective sets of the two-dimensional features extracted from the previous dataset. Each of the respective sets represents an appearance of an associated respective three-dimensional point across the previous dataset. Two-dimensional features may correspond, for example, to facial features of a human (e.g., eyes, nose, etc.), regions (e.g., particular areas of a crop field), pixels/groups of pixels across a plurality of images, and/or other observable aspects of image data. The three-dimensional composite map thus comprises a plurality of feature points mapped to a predefined coordinate system (e.g., two or three-dimensional).

In some embodiments, a two-dimensional feature is matched (508) in a first image and in a second image of the plurality of two-dimensional pixilated images. A parallax is then estimated (510) between the first image and the second image using respective meta data associated with the first image and the second image (e.g., respective positional and orientation data of the first and second images, translational and rotational trajectory derived therefrom, etc.). When the parallax between the first image and the second image satisfies a parallax threshold, a two or three-dimensional point is added (512) to the composite map at a distance obtained by triangulating the first image and the second image using respective meta data associated with the first image and the second image. In some embodiments, the matching (508), estimating (510), and adding (512) are repeated for different first and second images of the plurality of two-dimensional pixilated images.

Figure 5B:
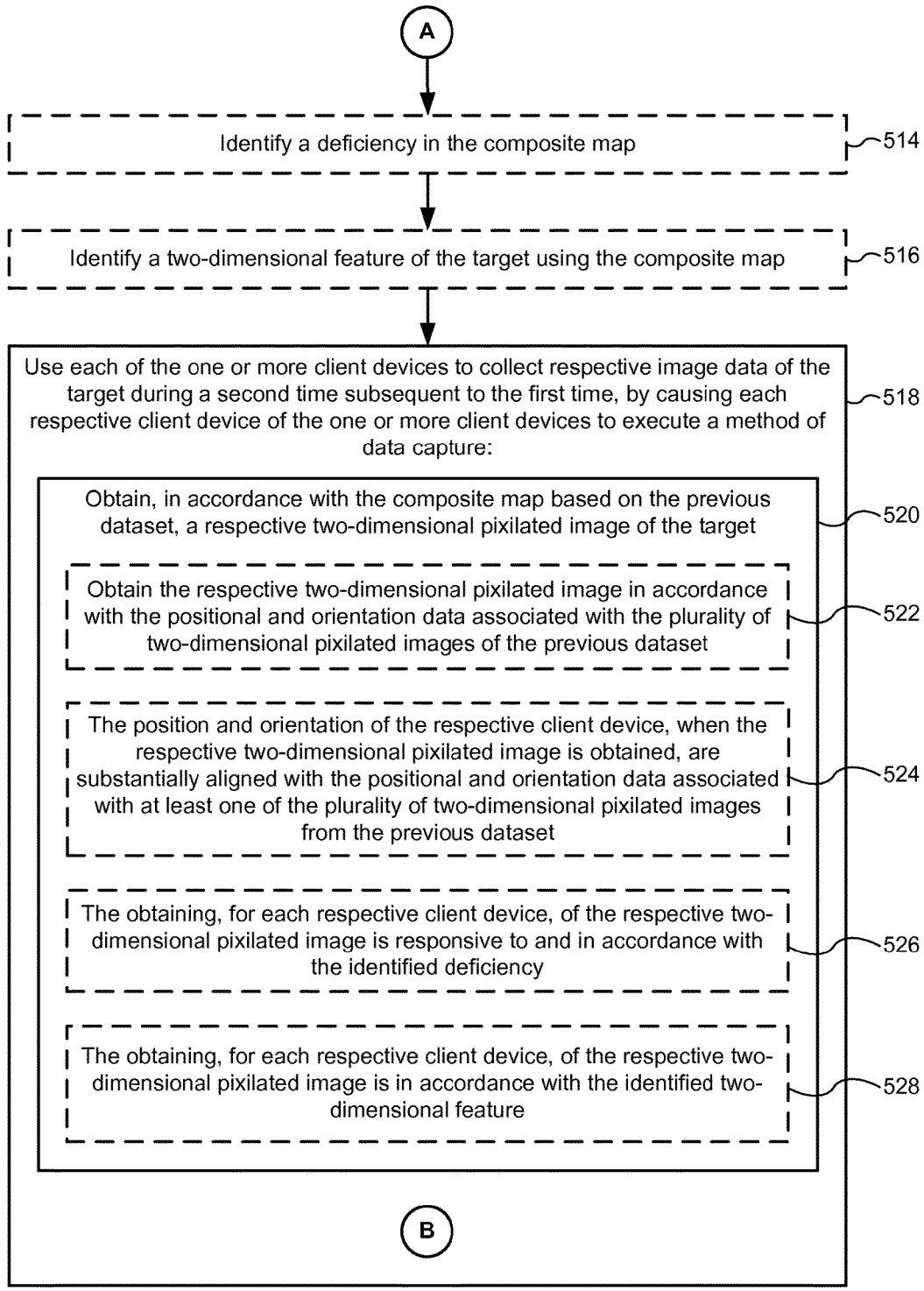

Referring now to FIG. 5B, each of the one or more client devices (e.g., client devices 104, FIG. 4A) are used to collect respective image data of the target during a second time subsequent to the first time, by causing each respective client device of the one or more client devices to execute a method of data capture. The method of data capture is described in detail with respect to FIGS. 5B-5C (steps 520 through 534), and is performed by one or more client devices (e.g., client devices 104-1, FIG. 4B) having respective memory storing instructions/programs for execution by one or more respective processors of the client devices. In some embodiments, a subset of the one or more client devices is used to collect respective image data of the target during the second time. For example, as shown in FIG. 4B, only client device 104-1 (and not client devices 104-2 through 104-4, FIG. 4A) is used to capture image data at the time T2. In some embodiments, a client device distinct from the one or more client devices is used to collect the respective image data (e.g., one set of client devices 104 used to obtain images for constructing the initial composite map, a different client device 104 used at a later time for follow-up image capture).

In some embodiments, the processing device causes one or more client devices to execute the method of data capture by sending control signals/commands to the one or more client devices. In some embodiments, the control signals/commands include instructions executable by a receiving device (e.g., client device 104, mobile apparatus) that modify parameters of a mobile pattern (e.g., the positioning of a drone) or capture parameters (e.g., increased image resolution, data capture start/end time, capture schedule, position/orientation of capture, etc.) for the receiving device. In some embodiments, the control signals/commands are based on and include information derived from the composite map or the previous dataset (e.g., associated positional/orientation data for a feature of interest with respect to a predefined coordinate system of the composite map).

Executing the method of data capture (518) includes obtaining (520), in accordance with the composite map based on the previous dataset, a respective two-dimensional pixilated image of the target. In some embodiments, a plurality of two-dimensional pixilated images of the target is obtained. In some embodiments, multiple client devices are used to collect image data, and each of the respective two-dimensional pixilated images are obtained in accordance with capture parameters of their respective client devices (e.g., position/orientation of capture, resolution, etc.), such that the captured images represent distinct aspects of the target (e.g., images obtained from distinct distances, heights, positions, orientations, etc. with respect to the target; images having distinct resolutions, capture frequencies; images representing distinct frequencies/frequency ranges of light (UV, IR)).

In some embodiments, obtaining (520) in accordance with the composite map includes obtaining the respective two-dimensional pixilated image in accordance with the respective meta data of the previous dataset (i.e., meta data associated with the plurality of two-dimensional pixilated images of the previous dataset, 502, FIG. 5A). Furthermore, in some embodiments, the obtaining (520) includes receiving (e.g., from the processing device) or identifying (e.g., from the previous dataset/composite map stored at a respective client device) at least a portion of the meta data and/or the obtained images of the previous dataset (e.g., receiving positional/orientation data or other meta data, receiving a portion of the composite map, etc.).

In some embodiments, the obtaining (520) in accordance with the composite map includes obtaining (522) the respective two-dimensional pixilated image in accordance with the positional and orientation data associated with the plurality of two-dimensional pixilated images of the previous dataset. Stated another way, the respective two-dimensional pixilated image is obtained consistent with positions and/or orientations associated with the images of the previous dataset. As an example, if the images of the previous dataset were obtained during time T1 at a fixed orientation with respect to the target (e.g., an angle θ), the two-dimensional pixilated image obtained at time T2 is also obtained while the respective client device is oriented at substantially the same fixed orientation. In some embodiments, the obtaining (522) is performed in accordance with at least a subset of the positional and orientation data associated with the plurality of two-dimensional pixilated images of the previous dataset. The subset of the positional and orientation data in the previous dataset may, for example, be a range of orientations (e.g., $\psi_1 < \psi < \psi_2$) with respect to, or a range of distances from (e.g., $d_1 < d < d_2$), the target. Consequently, by obtaining images in accordance with the positional and orientation data associated with the images of the previous dataset, image data captured at subsequent times may be temporally stacked and analyzed to detect changes over time.

In some embodiments, the position and orientation of the respective client device, when the respective two-dimensional pixilated image is obtained, are (524) substantially aligned with the positional and orientation data associated with at least one of the plurality of two-dimensional pixilated images from the previous dataset. An example is shown FIG. 4B, where the position and orientation of client device 104-1 (e.g., (x, y, z) coordinates, (ϕ, θ, ψ), etc.) are substantially aligned with the positional and orientation data associated with the image captured by the client device 104-1 at time T1.

In some embodiments, the image data collected by each of the client devices comprises a plurality of two-dimensional pixilated images obtained during the second time. A position and orientation of a respective one of the one or more computer-enabled imaging devices, for each of the plurality of two-dimensional pixilated images obtained during the second time, are substantially aligned with the positional and orientation data associated with a respective one of the plurality of two-dimensional pixilated images from the previous dataset. In other words, each of the images obtained during the second time have an associated position and/or orientation that is aligned with the associated position/orientation of an image from the previous dataset. In some embodiments, each of the images from the previous dataset with which the images obtained during the second time are aligned have distinct positional and orientation data (i.e., every image obtained during the second time corresponds to images from the previous dataset having associated positions/orientations that are distinct).

In some embodiments, using (518) each respective client device to collect respective image data further includes providing information indicating a proximity of a current position and orientation of a respective client device, to a respective position and orientation associated with at least one of the plurality of two-dimensional pixilated images from the previous dataset. Information indicating the proximity may include the position (e.g., (x, y, z) coordinates) and/or orientation (e.g., (ϕ, θ, ψ)) associated with at least one of the images from the previous dataset, a relative distance of the respective client device to a position/orientation associated with one of the images from the previous dataset, and/or an image from the previous dataset (e.g., the image shown on the screen of the client device 104-1 in FIG. 4A). In some embodiments, providing information indicating the proximity includes displaying, on the respective client device, visual information indicating the proximity so as to enable alignment of the respective position and orientation of the respective client device to match the position and orientation associated with the at least one of the plurality of two-dimensional pixilated images from the previous dataset. Visual information may be a visual display of the information indicating the proximity (e.g., position/ orientation, distance, the image, etc.). Additionally and/or alternatively, the visual information may include on-screen instructions for guiding an associated user to reposition the respective client device so as to achieve alignment (e.g., real-time feedback updating a proximity of the client device as it is repositioned, provided by utilizing sensors of the client device). For example, referring to FIG. 4B, the position and orientation associated with the image captured by the client device 104-1 (FIG. 4A) is displayed on-screen while the client device 104-1 is in its initial position in FIG. 4B (to the right-hand side of the user 102-1). Accordingly, a user operating the client device 104-1 may align the device based on the on-screen display so as to enable aligned data capture during time T2, and further allowing for subsequent temporal analysis. Alternatively, in some embodiments, a respective client device receives the information indicating the proximity of the respective client device and automatically (without user intervention) aligns itself accordingly. For example, in some embodiments, the respective client device receives control signals which, when executed by the respective client device (e.g., the client device is a mobile apparatus) or a mobile apparatus to which the respective client device is attached (e.g., attached drone device), aligns the respective client device.

In some embodiments, the obtaining (520) in accordance with the composite map includes obtaining the respective two-dimensional pixilated image in accordance with an indication of when a respective image of the previous dataset was obtained. Respective images may be obtained, for example, at the same time as the indicated time (e.g., same time, different day), at a predefined time from the indicated time (e.g., 2 hours), or in accordance with a schedule that is based on the indicated time (e.g., same time, every other day). For example, an image may be obtained at a time T2 that is 2 hours from the time at which a corresponding image from the previous dataset was obtained.

In some embodiments, the first time (502, FIG. 5A, time during which dataset is obtained for constructing the composite map) and the second time (518, FIG. 5B, time during which one or more client devices are used to collect image data and associate respective meta data in accordance with the composite map) are distinct and do not overlap (e.g., the first time corresponding to a first day, the second time corresponding to the day after). Alternatively, in some embodiments, the first time and the second time at least partially overlap. In some embodiments in which the first time and the second time at least partially overlap, data collected during the second time is added to the previous dataset, and the composite map is further constructed/refined (e.g., add points to, refine mapping, etc.) concurrent with the data collection at the second time.

In some embodiments, a deficiency is identified (514) (e.g., automatically by the processing device; by a respective client device; manually by a user) in the composite map. The deficiency may correspond, for example, to a portion of the composite map (or an image of the previous dataset) which is obstructed (e.g., object impeding view), or for which image data is insufficient or a corresponding resolution is below a threshold. Furthermore, in some embodiments, the obtaining (520), for each respective client device, of the respective two-dimensional pixilated image is (526) responsive to and in accordance with the identified deficiency (e.g., additional images obtained using corresponding positional and/or orientation data in order to compensate the deficiency).

In some embodiments, a two-dimensional feature of the target is identified (516) (e.g., automatically by the processing device; by a respective client device; manually by a user) using the composite map. As described previously, two-dimensional features may correspond, for example, to facial features of a human (e.g., eyes, nose, etc.), regions (e.g., particular areas of a crop field), pixels/groups of pixels across a plurality of images, and/or other observable aspects of image data (e.g., observed skin lesions, crop damage, structural damage, etc.). Furthermore, in some embodiments, the obtaining (520), for each respective client device, of the respective two-dimensional pixilated image is (528) in accordance with the identified two-dimensional feature. FIGS. 4A-4B illustrate such an example, where the lesion 402 is observed in the facial region of the user 102-1 (FIG. 4A), and subsequent image data captured by the client device 104-1 (FIG. 4B) is based on the observed lesion 402. Additionally and/or alternatively, a three-dimensional feature of the target is identified using the composite map, wherein the obtaining (520), for each respective client device, of the respective two-dimensional pixilated image is in accordance with the identified three-dimensional feature.

Figure 5C:
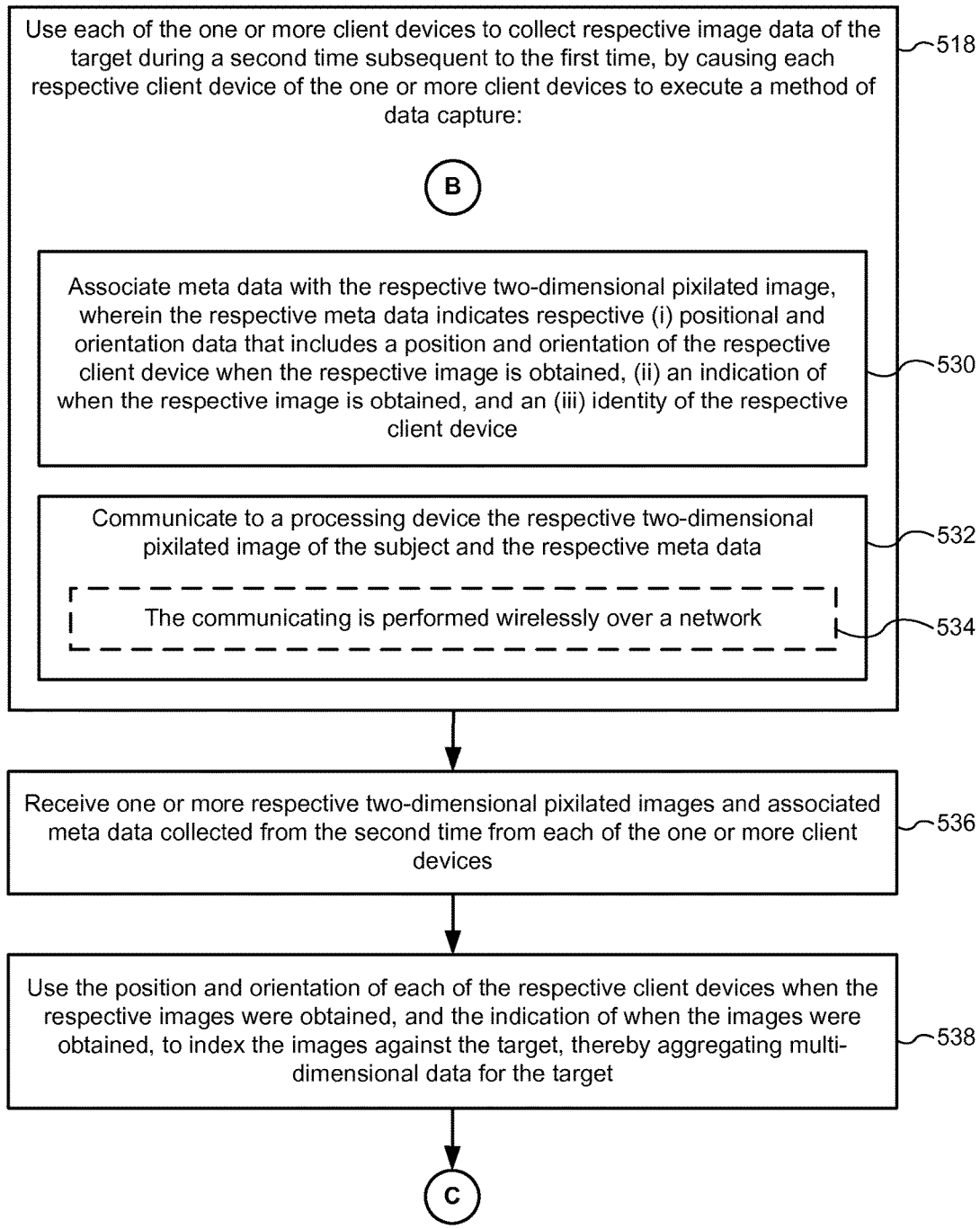

Referring now to FIG. 5C, executing the method of data capture (518) includes associating (530) meta data with the respective two-dimensional pixilated image, wherein the respective meta data indicates respective (i) positional and orientation data that includes a position and orientation of the respective client device when the respective image is obtained, (ii) an indication of when the respective image is obtained, and an (iii) identity of the respective client device (other examples of associated meta data are described throughout, in FIG. 3, for example).

Furthermore, executing the method of data capture (518) includes communicating (532) to a processing device (or a client device) the respective two-dimensional pixilated image of the target and the respective meta data. In some embodiments, the communicating is performed (534) wirelessly over a network (e.g., over a wireless communications interface, such as IEEE 802.11 Wi-Fi, Bluetooth, etc.; using a cellular communications protocol, such as GSM, CDMA, etc.). In some embodiments, the communicating is performed via a wired interface (e.g., transferring over a USB cable interface between the client device 104-1 and the processing device 108 at the conclusion of an image capture session). In some embodiments, the communicating includes transferring the images to the remote processing device via a removable storage device (e.g., a flash drive). In some embodiments, the communicating is performed concurrently with the obtaining (520) of the respective image and the associating (530) of respective meta data (e.g., streaming images and meta data in real-time as it is obtained).

The processing device receives (536) one or more respective two-dimensional pixilated images and associated meta data collected from the second time from each of the one or more client devices. Furthermore, the processing device uses (538) the position and orientation of each of the respective client devices when the respective images were obtained, and the indication of when the images were obtained, to index the images against the target, thereby aggregating multi-dimensional data for the target. Thus, the images obtained and the meta data associated during the second time are used to temporally stack data captured for to the target. In some embodiments, the images are indexed against the target by matching the images based on one or more types of associated meta data (e.g., matching based on device identifier, position/orientation, time of capture, etc.).

In some embodiments, the one or more respective two-dimensional pixilated images and associated meta data are added to the previous dataset (502), and the composite map is further constructed and/or refined (in accordance with embodiments described with respect to FIG. 5A) based on the one or more respective two-dimensional pixilated images and associated meta data added to the previous dataset.

Figure 5D:
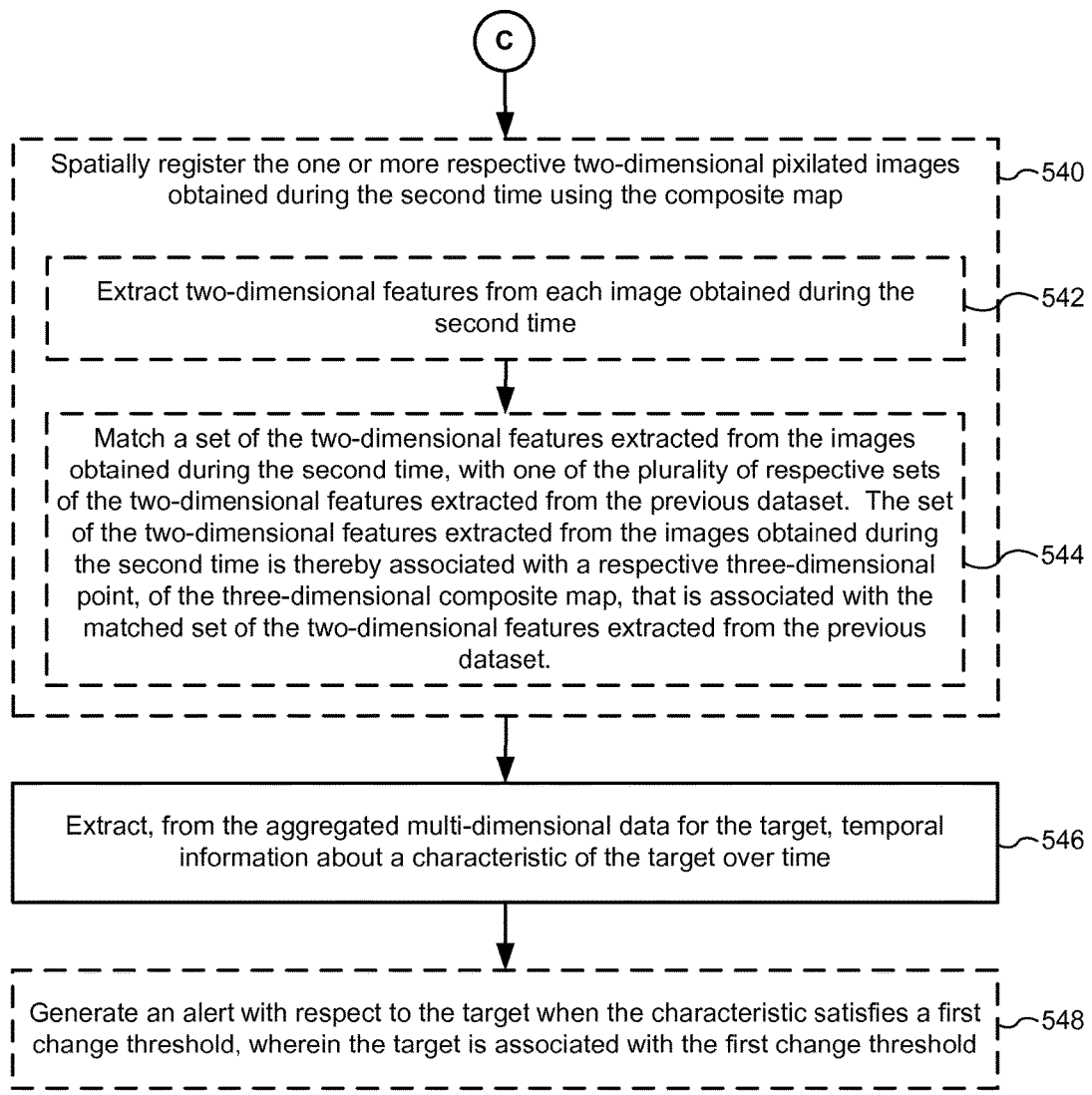

Referring now to FIG. 5D, in some embodiments, the one or more respective two-dimensional pixilated images obtained during the second time are spatially registered (540) using the composite map. In some embodiments, the spatial registering includes extracting (542) two-dimensional features from each image obtained during the second time. A set of the two-dimensional features extracted from the images obtained during the second time, is matched (544) with one of the plurality of respective sets of the two-dimensional features extracted from the previous dataset (504, FIG. 5A). The set of the two-dimensional features extracted from the images obtained during the second time is thereby associated with a respective three-dimensional point, of the three-dimensional composite map, that is associated with the matched set of the two-dimensional features extracted from the previous dataset. By spatially registering features extracted from images obtained during different times (e.g., the first and second times), captured image data is aligned, and subsequent temporal processing is thereafter performed (e.g., change detection for a given target or feature of a subject).

In some embodiments, at least a portion of the aggregated multi-dimensional data for the target is displayed (e.g., by the processing device, a dedicated display terminal, a client device, etc.). In some embodiments, displaying the aggregated multi-dimensional data includes displaying a visual indicator (e.g., time lapse video, side-by-side comparisons, composite image, etc.) for an observed change of the target (e.g., growth of a lesion, mitigation of damage, etc.). In some embodiments, the observed change of the target is a change observed between the first time (e.g., 502, FIG. 5A, when the composite map was constructed) and the second time (e.g., step 518, FIG. 5B, when image data was collected based on the composite map). In some embodiments, the aggregated multi-dimensional data is displayed with respect to a specified time parameter (e.g., selective images for a target are displayed based on a predefined range of dates, a particular time, etc.). In some embodiments, the aggregated multi-dimensional data is displayed on a virtual reality display for display and/or manipulation.

Temporal information about a characteristic of the target over time is extracted (546) from the aggregated multi-dimensional data for the target. Characteristics relate to observable aspects (e.g., two or three-dimensional physical attributes) of the target, represented by quantitative (e.g., numerical value) and/or qualitative data at or during a particular time. As an example, characteristics of a skin lesion may be represented by data related to location (e.g., diffuse, localized), lesion size (e.g., surface area, volume), size distribution, quantity, shape, etc. Values of a characteristic may correspond to two-dimensional (e.g., square footage of damaged crop region) or three-dimensional measurements (e.g., volume of a blister). In contrast to values of a characteristic, temporal information represents observed changes of a characteristic of the target over a predefined period of time (e.g., change in value for a characteristic between a first and second time). For example, temporal information may indicate that since a last image capture, the size of previously observed lesions has increased by a measurable amount (e.g., expressed as a quantifiable amount, such as a quantity or percentage of change). Temporal information may represent changes measured with respect to any specified point or range of time (e.g., difference between current data for a characteristic and most-recently measured data, initial data, data measured on a certain date at a certain time, etc.).

In some embodiments, extracting (546) the temporal information includes identifying a first value for the characteristic corresponding to the first time, identifying a second value for the characteristic corresponding to the second time, and comparing the first and second values to determine the temporal information about the characteristic of the target. In some embodiments, the temporal information is a difference (i.e., a change) between the second value and the first value (e.g., change in size (surface area, volume) of a lesion over time). In some embodiments, the temporal information is a rate of change, corresponding to a difference between the first and second values with respect to a difference between the first and second times. That is, the temporal information corresponds to the rate at which some characteristic of the measured target (e.g., volume of a blister) is changing over a predefined period of time. The rate of change may indicate a positive rate of change (e.g., increase of size) or a negative rate of change (e.g., shrinkage). Furthermore, in some embodiments, the temporal information is a differential rate of change (i.e., the rate at which the rate of change for a characteristic changes over time). Here, the first value is a first rate of change of the characteristic during the first time, the second value is a second rate of change of the characteristic during the second time, and the temporal information is a differential rate of change, corresponding to a difference between the first and second values with respect to a difference between the first and second times. The differential rate of change therefore indicates a rate at which respective rates of change for the characteristic changes over time (e.g., the rate at which disease spreads through a crop field decreases over time). In some embodiments, the differential rate of change is measured with respect to values for a characteristic over more than two distinct points in time (e.g., a first rate of change measured between time T1 and T2, a second rate of change measured between time T2 and T3, and a third rate of change measured between time T3 and T4, where the differential rate of change is the rate at which the rates of change measured between times T1 and T4 change).

There are numerous examples in which the various types of temporal information above (e.g., change, rates of change, differential rates of change) may be derived. For example, changes in volume, and the rate at which volume changes, may be identified for lesions above the normal skin surface, blisters, edematous reactions, etc. Furthermore, continuing the example of lesion growth, extrapolated differential rates of change may indicate an increase or decrease in cell number, where cancerous lesions may correspond to a continuously increasing rate of growth, while benign lesions correspond to a decreasing rate of growth. For lesions below the skin surface, a healing wound may correspond to a decrease in crater volume over time, or a worsening pressure ulcer may correspond to an increase in crater volume over time. Other examples include facial swelling (e.g., change, rates of change, differential rates of change, for the swelling of fingers/eyelids/lips over time). Within an agricultural context, rates of increasing or decreasing biomass volume may also be measured. Another example is temporal information determined for surface topology (e.g., smooth to rough, multiple blisters to one coalesced blister, changes in crease structure (wrinkles, fault lines, etc.). Temporal information for changes in color distribution include changes of characteristics (e.g., developing more pigmented globules, blood leaking into a blister, increasing green oxidation of a copper statue), rates of change in color distribution, and differential rates of change (e.g., indicating that bleeding is slowing down, corrosion protection is effective, etc.). Temporal changes may also be derived for three-dimensional shapes of a target (e.g., initial spherical shape transitioning into a grape-like structure, a uniform column becoming narrower at the top and thickening at the base, etc.). Changes in Tyndall effect (e.g., changes in light scattering through a volume, blue scattered back to camera), or changes volume in clarity (e.g., less purulent drainage, lake clearing as runoff dirt settles) may also be derived.

In some embodiments, temporal information is derived directly by comparing composite maps constructed at different times in order to identify spatial and/or spectral differences of features of the target over time. For example, in some embodiments, the composite map based on the previous dataset (502, FIG. 502) is a first composite map, and the image data collected during the second time by using each of the one or more computer-enabled imaging devices (518, FIG. 5B) includes a plurality of two-dimensional pixilated images of the target (520) and the associated meta data (530, FIG. 5C). A second composite map is constructed based on the image data collected during the second time. The second composite map (corresponding to the second time) is then compared with the first composite map (corresponding to the first time) to identify respective differences in one or more three-dimensional features from the first time to the second time. In some embodiments, spatial data (e.g., positional data identified by associated meta data) of the one or more features is compared between the first and second composite maps (e.g., (x, y, z) coordinates of feature points compared in order to identify three-dimensional growth of a feature over time). In some embodiments, spectral data (e.g., color distribution of a feature) of the one or more features is compared between the first and second composite maps. In some embodiments, the respective identified differences include a respective shape of the one or more three-dimensional features (e.g., transition from a circular to jagged shape). In some embodiments, the respective identified differences include a respective volume of the one or more three-dimensional features. In some embodiments, the respective identified differences include a respective surface contour of the one or more three-dimensional features (e.g., a contour map is generated based on differences in the surface contours of a three-dimensional feature between the first and second times). In some embodiments, the respective identified differences include a respective smoothness or roughness of the one or more three-dimensional features (e.g., wherein smoothness or roughness is based on a spatial deviation from a mean line for mapped points of a particular feature). In some embodiments, the respective identified differences include a respective opacity of the one or more three-dimensional features. In some embodiments, the respective identified differences include a respective color gradient of the one or more three-dimensional features. In some embodiments, the respective identified differences include a respective internal structure of the one or more three-dimensional features.

In some embodiments, an alert is generated (548) with respect to the target (and is optionally displayed on the processing device or other display device) when the characteristic satisfies a first change threshold, wherein the target is associated with the first change threshold. Change thresholds may be quantitative thresholds (e.g., percentage, numerical quantity, etc. of change, rate of change, differential rates of change, etc.) or qualitative thresholds (e.g., transition from a specific color pigmentation, shape, etc. to another). Change thresholds may also be defined with respect to any predefined period of time (e.g., over 10 days, a month, etc.). For example, an observed lesion growth rate in excess of 10% over the course of a month may trigger the generation and display of an alert to a target subject or a physician.

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A computer-implemented method of aggregating multi-dimensional data for a target at a central controlling system, the method comprising:
    constructing a composite map based on a previous dataset, wherein the previous dataset includes:
        a plurality of two-dimensional pixilated images of the target obtained by one or more computer-enabled imaging devices during a first time, and
        respective meta data associated with each of the plurality of two-dimensional pixilated images, wherein the respective meta data indicates (i) positional and orientation data that includes a position and orientation of a respective computer-enabled imaging device when the respective image is obtained, (ii) an indication of when the respective image is obtained, and an (iii) identity of the respective computer-enabled imaging device;
    using each of the one or more computer-enabled imaging devices to collect respective image data of the target during a second time subsequent to the first time, by causing each respective computer-enabled imaging device of the one or more computer-enabled imaging devices to execute a method of data capture, including:
        in accordance with the composite map based on the previous dataset, obtaining a respective two-dimensional pixilated image of the target;
        associating meta data with the respective two-dimensional pixilated image, wherein the respective meta data indicates respective (i) positional and orientation data that includes a position and orientation of the respective computer-enabled imaging device when the respective image is obtained, (ii) an indication of when the respective image is obtained, and an (iii) identity of the respective computer-enabled imaging device; and
        communicating to the central controlling system the respective two-dimensional pixilated image of the target and the respective meta data;
    at the central controlling system, the central controlling system having one or more processors and memory for storing one or more programs for execution by the one or more processors, executing the method of:
        receiving one or more respective two-dimensional pixilated images and associated meta data collected from the second time from each of the one or more computer-enabled imaging devices;
        using the position and orientation of each of the respective computer-enabled imaging devices when the respective images were obtained, and the indication of when the images were obtained, to index the images against the target, thereby aggregating multi-dimensional data for the target;
        extracting, from the aggregated multi-dimensional data for the target, temporal information about a characteristic of the target over time; and
        identifying a deficiency in the composite map, wherein the obtaining, for each respective computer-enabled imaging device, of the respective two-dimensional pixilated image is responsive to and in accordance with the identified deficiency.

2. The computer-implemented method of claim 1, further comprising identifying a two-dimensional feature of the target using the composite map, wherein the obtaining, for each respective computer-enabled imaging device, of the respective two-dimensional pixilated image is in accordance with the identified two-dimensional feature.

3. The computer-implemented method of claim 1, further comprising identifying a three-dimensional feature of the target using the composite map, wherein the obtaining, for each respective computer-enabled imaging device, of the respective two-dimensional pixilated image is in accordance with the identified three-dimensional feature.

4. The computer-implemented method of claim 1, wherein obtaining, for each respective computer-enabled imaging device, the respective two-dimensional pixilated image in accordance with the composite map comprises:
    obtaining the respective two-dimensional pixilated image in accordance with the positional and orientation data associated with the plurality of two-dimensional pixilated images of the previous dataset.

5. The computer-implemented method of claim 1, wherein the position and orientation of the respective computer-enabled imaging device, when the respective two-dimensional pixilated image is obtained, are substantially aligned with the positional and orientation data associated with at least one of the plurality of two-dimensional pixilated images from the previous dataset.

6. The computer-implemented method of claim 1, wherein:
    the image data collected by each of the one or more computer-enabled imaging devices comprises a plurality of two-dimensional pixilated images obtained during the second time; and
    a position and orientation of a respective one of the one or more computer-enabled imaging devices, for each of the plurality of two-dimensional pixilated images obtained during the second time, are substantially aligned with the positional and orientation data associated with a respective one of the plurality of two-dimensional pixilated images from the previous dataset.

7. The computer-implemented method of claim 1, wherein using each respective computer-enabled imaging device to collect respective image data further comprises:
    providing information indicating a proximity of a current position and orientation of a respective computer-enabled imaging device, to a respective position and orientation associated with at least one of the plurality of two-dimensional pixilated images from the previous dataset.

8. The computer-implemented method of claim 7, wherein providing information indicating the proximity comprises displaying, on the respective computer-enabled imaging device, visual information indicating the proximity so as to enable alignment of the respective position and orientation of the respective computer-enabled imaging device to match the position and orientation associated with the at least one of the plurality of two-dimensional pixilated images from the previous dataset.

9. The computer-implemented method of claim 1, further comprising:
    using the composite map, spatially registering the one or more respective two-dimensional pixilated images obtained during the second time.

10. The computer-implemented method of claim 9, wherein constructing the composite map comprises:
    extracting two-dimensional features from each image of the previous dataset; and
    using the two-dimensional features extracted from the previous dataset, creating a three-dimensional composite map comprising a plurality of three-dimensional points, wherein each respective three-dimensional point of the plurality of three-dimensional points is associated with one of a plurality of respective sets of the two-dimensional features extracted from the previous dataset,
    each of the respective sets representing an appearance of an associated respective three-dimensional point across the previous dataset.

11. The computer-implemented method of claim 10, wherein the spatially registering comprises:
    extracting two-dimensional features from each image obtained during the second time; and
    matching a set of the two-dimensional features extracted from the images obtained during the second time, with one of the plurality of respective sets of the two-dimensional features extracted from the previous dataset,
    thereby associating the set of the two-dimensional features extracted from the images obtained during the second time with a respective three-dimensional point, of the three-dimensional composite map, that is associated with the matched set of the two-dimensional features extracted from the previous dataset.

12. The computer-implemented method of claim 1, wherein constructing the composite map comprises:
    matching a two-dimensional feature in a first image and in a second image of the plurality of two-dimensional pixilated images;
    estimating a parallax between the first image and the second image using respective meta data associated with the first image and the second image; and
    adding, when the parallax between the first image and the second image satisfies a parallax threshold, a two or three-dimensional point to the composite map at a distance obtained by triangulating the first image and the second image using respective meta data associated with the first image and the second image.

13. The computer-implemented method of claim 1, wherein:
    the composite map based on the previous dataset is a first composite map, and
    the image data collected during the second time by using each of the one or more computer-enabled imaging devices comprises a plurality of two-dimensional pixilated images of the target and the associated meta data,
    the method further comprising:
        constructing a second composite map based on the image data collected during the second time; and
        comparing the second composite map with the first composite map to identify respective differences in one or more three-dimensional features from the first time to the second time.

14. The computer-implemented method of claim 13, wherein the respective identified differences include a respective shape of the one or more three-dimensional features.

15. The computer-implemented method of claim 13, wherein the respective identified differences include a respective volume of the one or more three-dimensional features.

16. The computer-implemented method of claim 13, wherein the respective identified differences include a respective surface contour of the one or more three-dimensional features.

17. The computer-implemented method of claim 13, wherein the respective identified differences include a respective smoothness or roughness of the one or more three-dimensional features.

18. The computer-implemented method of claim 13, wherein the respective identified differences include a respective opacity of the one or more three-dimensional features.

19. The computer-implemented method of claim 13, wherein the respective identified differences include a respective color gradient of the one or more three-dimensional features.

* * * * *